United States Patent [19]

Edgel

[11] Patent Number: 4,579,756
[45] Date of Patent: Apr. 1, 1986

[54] INSULATION MATERIAL WITH VACUUM COMPARTMENTS

[76] Inventor: Rex D. Edgel, 1061 S. Navajo, Salt Lake City, Utah 84104

[21] Appl. No.: 639,630

[22] Filed: Aug. 13, 1984

[51] Int. Cl.$^4$ ............................ B32B 3/28; B32B 3/10
[52] U.S. Cl. ...................... 428/34; 52/309.1; 206/524.8; 428/43; 428/69; 428/76; 428/178; 428/182; 428/920
[58] Field of Search ............... 428/69, 43, 76, 166, 428/182, 178, 184, 412, 920, 34; 206/461, 469, 471, 524.8; 52/309.1

[56] References Cited

U.S. PATENT DOCUMENTS

| | | | |
|---|---|---|---|
| 2,939,811 | 6/1960 | Dillon | 428/69 |
| 3,630,346 | 12/1971 | Burnside | 206/461 |
| 4,167,598 | 9/1979 | Logan et al. | 428/166 |
| 4,204,015 | 5/1980 | Wardlaw et al. | 428/178 |
| 4,304,824 | 12/1981 | Karpinski | 428/69 |

FOREIGN PATENT DOCUMENTS 7503673  9/1975  Netherlands ................. 428/69

Primary Examiner—Paul J. Thibodeau
Attorney, Agent, or Firm—Mallinckrodt & Mallinckrodt

[57] ABSTRACT

An insulating sheet material is made of a plurality of air tight chambers, each having a partial vacuum therein, held together in closely spaced side-by-side relationship so as to form a sheet of such compartments. The insulating sheet may be formed of sheets of material bonded together so as to form the side-by-side compartments, or the compartments may be individually formed and secured in side-by-side relationship by a film of material to which the compartments are adhered. The insulation sheet is preferrably perforated between compartments so that the sheet can be easily torn to any desired size.

1 Claim, 11 Drawing Figures

INSULATION MATERIAL WITH VACUUM COMPARTMENTS

BACKGROUND OF THE INVENTION

1. Field:

The invention is in the field of insulation for building or other purposes.

2. State of the Art:

With the cost of energy continuing to rise, people have become energy conscious. As part of this energy consciousness, there has been a continuing search for improved insulating materials to be used particularly in building to reduce heat loss from or heat entry into buildings and homes. The most common insulating materials are fiberglass batting, expanded plastic foam and cellulose insulation made from newspapers and cardboard. U.S. Pat. No. 2,039,601 shows building panels having sealed air compartments therein that act as insulation.

Vacuum has been known as an insulator, but has not been used in building materials. Since vacuum must be held in a chamber, and such chamber must be relatively strong, the use of vacuum as insulation has been limited to small containers such as thermos bottles. U.S. Pat. No. 3,150,793 shows a tank structure made up of insulating sections having vacuum therein while U.S. Pat. No. 3,769,770 shows a super insulating material made up of tiny spheres maintained in a vacuum and describes also another super insulating product made up of foil layers and fibrous material maintained in a vacuum. Such insulation may have as many as 75 layers per inch. These materials, however, are used only in special high heat applications and are not generally available or economical enough for use as building insulation.

SUMMARY OF THE INVENTION

According to the invention, insulating sheet material is made of a plurality of air tight, evacuated compartments held together in side-by-side relationship so as to form a sheet of such compartments.

In one embodiment of the invention, the compartments are individually formed of material rigid enough to maintain its shape and not collapse as a result of the vacuum therein, or of a flexible material placed about a relatively rigid, porous material which holds the flexible material against collapse.

In a second embodiment of the invention two sheets of flexible, air impervious material, such as sheet plastic, are sealed together in a grid pattern to form individual, evacuated pockets each containing substantially rigid, porous material which keeps the two sheets of flexible material spread apart with the vacuum inside the compartments.

When using flexible material, the porous material may take a variety of forms such as corrugated cardboard, corrugated or honeycomb rigid plastic, or a plastic foam material. The purpose of the porous material is to hold the two layers of plastic apart against the vacuum inside the compartment while still providing space for the vacuum so that its insulating properties may be realized. It is preferred that the sheet be perforated between compartments so that it may be easily torn along such perforations to vary the size of the sheet to that needed for any particular application.

THE DRAWINGS

In the accompanying drawings, which illustrate embodiments of the invention constituting the best mode presently contemplated for carrying out the invention in actual practice:

FIG. 1 is a top plan view of a portion of a sheet of insulation of the invention;

FIG. 2, a vertical section taken on the line 2—2 of FIG. 1 and showing one embodiment of the compartments of the invention;

FIG. 3, a horizontal section taken through a building wall showing the insulation of the invention installed between two upright wall supporting studs;

FIG. 4, a view similar to FIG. 3, but showing the insulation of the invention installed in an alternate manner;

FIG. 5, a horizontal section through a relatively small diameter pipe showing how the insulation of the invention can be installed about the pipe;

FIG. 6, a horizontal section through a relatively large diameter pipe showing the insulation of the invention installed about the pipe;

FIG. 7, a vertical section similar to that of FIG. 2, but showing a second embodiment of the invention;

FIG. 8, a top plan view of a portion of a sheet of insulation showing a second embodiment thereof;

FIG. 9, a vertical section similar to FIGS. 2 and 7, but showing a third embodiment of the invention;

FIG. 10, a top plan view of a portion of a sheet of insulation showing a third embodiment thereof; and FIG. 11, a vertical section through an insulating window pane of the invention.

DETAILED DESCRIPTION OF THE ILLUSTRATED EMBODIMENT

Figure 1:
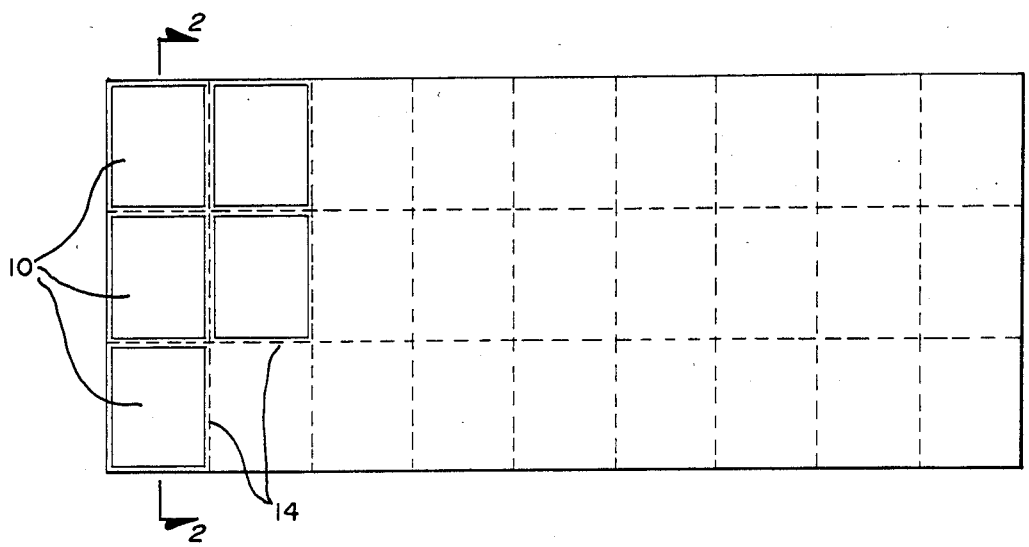

As illustrated in the drawings, a sheet of insulation according to the invention has a series of side by side vacuum compartments 10. In one embodiment of the invention, these compartments are separated by a seam where two separate sheets of material 11 and 12, FIG. 2, have been joined together such as by heat sealing. If the sheets of material 11 and 12 are flexible, each vacuum compartment contains a substantially rigid, but porous material such as a block of corrugated cardboard 13, which spreads the flexible sheets 11 and 12 and holds them apart against the vacuum inside the compartment. The block of substantially rigid material 13 should have low heat conductive properties so it will not substantially affect the benefit of the vacuum in the compartment in terms of resistance to heat transfer. Further, the material should be relatively porous so that the maximum benefit can be obtained from the vacuum in the compartment. Corrugated cardboard, corrugated or honeycomb plastic, or plastic foam has been found satisfactory as the porous materials, but various other porous materials may be used with comparative results. As used herein, the flexible material is any material that will not maintain the shape of the compartments when a vacuum is applied in the compartments. This material may be a polyolifin or polyamide plastic in the form of a sheet or film, or may be thicker, more rigid sheets of plastic material, but not rigid enough to hold their shape against a vacuum in the compartment. Thus, the porous reinforcing material is necessary.

It is preferred that the insulation sheets be perforated as at 14 along the seal between compartments so that it can be torn and separated along such perforations without breaking the seal to any of the compartments and allowing air to enter. With the perforations, the insulating material may come in rolls with the needed length for any particular space to be insulated merely torn off along the closest perforations. The rolls would come in standard widths to fit standard building framing, but again, if a narrower width is needed, the sheet may be merely ripped along the nearest perforation to the desired size. While FIG. 1 shows the sheet only three compartments wide, this is done merely for illustration purposes as the sheets will normally be wider. For example, the compartments may each be two inches square in size with a thickness of at least one-half inch, with the seam between compartments being about one-half inch or less.

Figure 3:
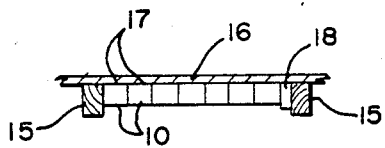
Figure 4:
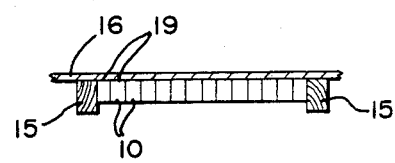
Figure 5:
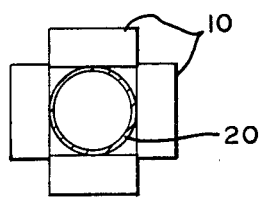
Figure 6:
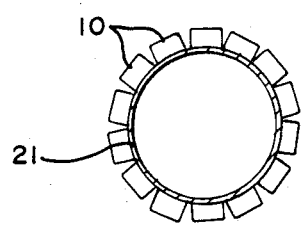

In a building, the insulation may be installed with the sheet between studs and behind obstructions such as electrical boxes, romex wiring, electrical conduits, or plumbing in a variety of ways. The insulation sheet may be installed flat between wall studs 15 with the compartments 10 against the wall 16 as shown at 17 in FIG. 3, any extra width of the insulation sheet being adjusted by placing one or more compartments with an edge to the wall as shown at 18. If more thickness of insulation is desired, the sheet can be folded upon itself so that the edges of the compartments are all against the wall as at 19 in FIG. 4. It can also be placed about small pipes such as indicated by reference 20 in FIG. 5 or larger pipes 21 as shown in FIG. 6.

The insulation may be installed by gluing it in place, using nails or staples placed in the studs so as to hold the insulation in place, but not pierce any of the compartments, holding it in place with electrical or other braces, or holding it by any other suitable means.

Figure 7:
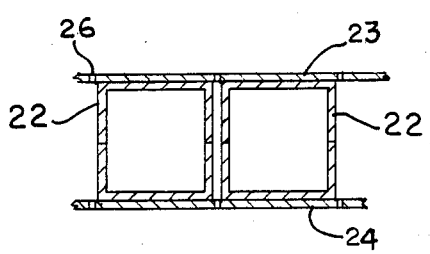
Figure 8:
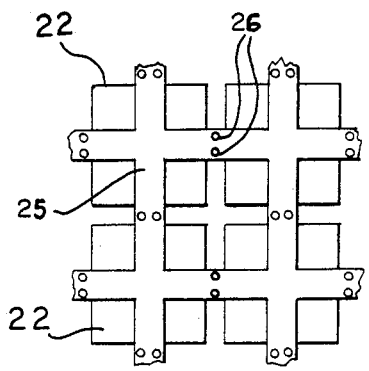

FIG. 7 shows an embodiment of the invention wherein the compartments 22 are individually formed of a material rigid enough to hold its shape and not collapse with a vacuum in the compartment. The individual compartments 22 are secured in side-by-side configuration by adhering them to a film of flexible material 23 in any suitable manner. A second film of flexible material 24 may be adhered to the opposite side of the compartments 22, if desired. The sheets 23 and 24 may each be a continuous film to form an insulating sheet where the films cover one or both faces of the entire sheet, or the films 23 and 24 may be in the form of a web such as shown at 25 in FIG. 8 so that they only partially cover the faces. In either case, the rigid compartments can be held closely together to prevent heat flow between the compartments.

Again, it is preferred that the film material 23, 24 or 25 be perforated as at 26 between compartments so that the sheets can be easily torn to form insulating sheets of any desired size, without damage to the compartments.

Figure 2:
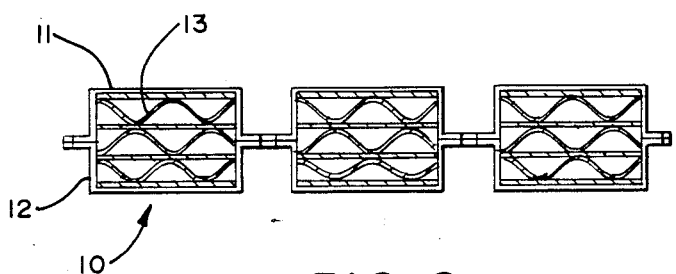
Figure 9:
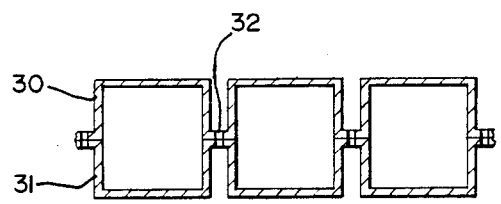

FIG. 9 shows a further embodiment which uses two sheets 30 and 31 of rigid material which is molded, heat formed, or vacuum formed and which has seams coming together as for the flexible material of FIG. 2. This material may be perforated as at 32 so the sheet can be easily broken along such perforations and separated into sheets of desired size. Rather than coming together at a seam intermediate the faces of the insulation sheet as shown in FIG. 9, the compartments could be formed in one of the sheets of rigid material and sealed to a substantially flat second sheet to from similar compartments.

The rigid material used may be a polycarbonate plastic such as that sold under the trademark LEXAN by General Electric. This plastic is strong and has good fire retardant properties. If other types of plastic are used, it may be desirable to treat the plastic material, or any porous filler materials with fire retardant. It may also be desirable to use a foil or plastisized foil as the film material holding the compartments in side-by-side relationship. The foil material could be used on both faces of the sheet or could be used on one face of the sheet while other plastic film or butcher paper material is used on the other face. If foil is used on only face, when installed, the foil side of the sheet would preferrably be toward the interior space of the building. Where flexible material is used as shown in FIG. 2, one or both sheets of such material could be a plastisized foil material.

It should be realized that individual compartments could also be made of a flexible material positioned about a rigid porous material so that the compartments would be as illustrated in FIG. 2, but would be separately formed and secured in side-by-side relationship by a film as shown in FIG. 7.

Figure 10:
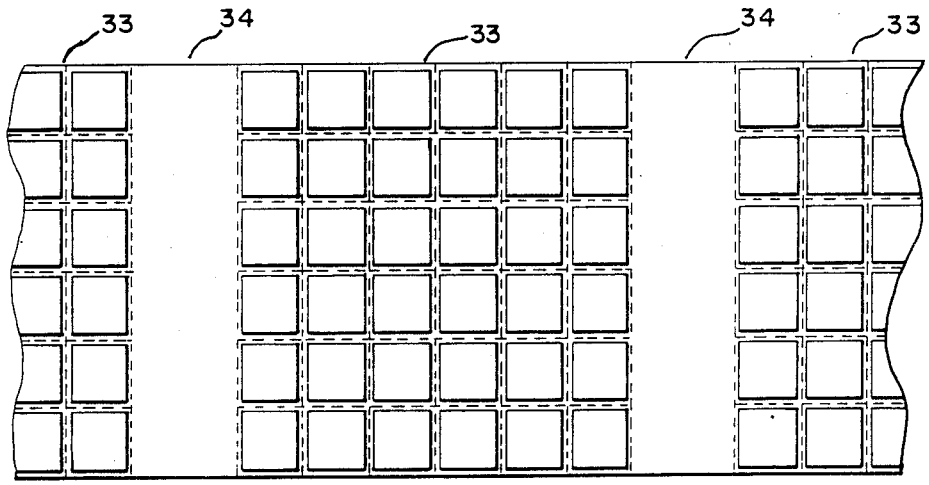

FIG. 10 shows a sheet of insulation material wherein the vacuum compartments are secured together in side-by-side relationship to form insulation sections 33 which are separated by flat sections 34 of film material without the compartments and which sections are the width of normal wall studs so that the insulation sheet can be installed along a wall with insulation sections 33 fitting between studs and sections 34 going over the studs and being secured thereto by staples, nails, or merely held in place by the wall material secured to the studs.

Figure 11:
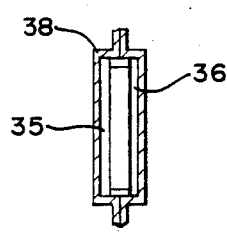

FIG. 11 shows the invention applied to an insulated window pane. As shown, two panes of glass or transparent plastic 35 and 36 are spaced apart by spacers 37 about their periphery. The area between the panes is evacuated and a flexible plastic material 38 is sealed about the window panes and spacers to form a sealed unit. This construction is particularly useful for the smaller window panes used in many older windows. This makes it easy to replace such older single panes with insulated panes which are not otherwise available.

As used herein, a vacuum within a compartment refers to a partial vacuum. Of course, the greater the vacuum, the greater the insulating properties therof. The material forming the compartments, whether flexible or rigid, must be impervious to the flow of air therethrough. While the insulating material has been described principally with reference to its use as sheets for building purposes, it should be realized that it could be used in various other applications such as for insulation in the walls of portable coolers or as packing material about items to be kept cold or at stable temperatures.

The individual vacuum compartments or the series of joined vacuum compartments of FIG. 2, may be formed of flexible material such as coated paper, film, or foil laminated over the porous material by a vacuum bag sealer machine such as Audion PAC vacuum bag sealer Series VB, or Series V manufactured by PackagingAids Corporation of San Francisco, Calif.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. Transparent insulating material comprising two rigid sheets of transparent material, spacer means about the periphery of the sheets of rigid material to hold them in spaced relationship; and transparent air impervious flexible material sealed about the rigid sheets of transparent material and spacers to form an air tight chamber between the rigid sheets; and a partial vacuum within the chamber.

* * * * *